United States Patent

Gross et al.

[15] 3,665,296
[45] May 23, 1972

[54] SUSCEPTIBILITY METER FOR FIELD USE FOR DETERMINING SUSCEPTIBILITY OF A ROCK OUTCROP

[72] Inventors: Harry Gross; David T. Symons, both of Ottawa, Ontario, Canada

[73] Assignee: Canadian Parts and Development Limited, Ottawa, Ontario, Canada

[22] Filed: Dec. 16, 1969

[21] Appl. No.: 885,412

[52] U.S. Cl. ............................................. 324/34 S, 324/34 D
[51] Int. Cl. ......................................................... G01r 33/16
[58] Field of Search ............... 324/34 R, 34 S, 34 ST, 34 TK; 318/646, 647, 653, 655–658

[56] References Cited

UNITED STATES PATENTS

| | | | |
|---|---|---|---|
| 2,602,660 | 7/1952 | Shannon | 318/658 X |
| 2,833,985 | 5/1958 | Martin et al | 324/34 R |

OTHER PUBLICATIONS

Abbott et al.; A Comparator for Materials of Low Magnetic Susceptibility; Journal of Scientific Instruments; Vol. 31, May 1954; pp. 155–158

Hutchinson et al.; An Electrodynamic Balance for Measurement of Magnetic Susceptibilities; Journal of Scientific Instruments; Vol. 23; Sept. 1946 pp. 209–211

Senftle, F.; Absolute Method of Measuring Mag. Susceptibility; The Rev. of Scien. Inst.; Vol. 30, No. 11; Nov. 1959; pp. 1006–1008

Primary Examiner—Rudolph V. Rolinec
Assistant Examiner—R. J. Corcoran
Attorney—Stevens, Davis, Miller & Mosher

[57] ABSTRACT

A method and apparatus measures susceptibility of a rock specimen by measuring the change of the equilibrium forces acting upon an electromagnet. The displacement of the magnet from equilibrium is detected in any one of a number of ways and is translated into an error signal which is amplified and coupled so as to give rise to a force which always opposes any displacement and which tends to reduce it to zero. When the magnet is again in equilibrium the force to keep it so against the added influence of the rock specimen is measured and gives the susceptibility.

2 Claims, 7 Drawing Figures

DC SUSCEPTIBILITY

Patented May 23, 1972

SUSCEPTIBILITY METER FOR FIELD USE FOR DETERMINING SUSCEPTIBILITY OF A ROCK OUTCROP

This problem relates to susceptibility measurement in the field and in particular a device which measures susceptibility by determining the force between a magnet and the specimen of rock outcrop.

Previous devices have used alternating current to measure the variation in electromagnetic coupling between two coils caused by the outcrop under test. Unfortunately, the reading though mainly dependent on susceptibility can also be influenced by conductivity of the rock outcrop, which can cause coupling by acting as a short circuited turn of a certain resistance.

We have found that the susceptibility may be directly, rather than inferentially determined, by measuring the force required to maintain a magnet at a predetermined distance from the outcrop. This of course, is not easy as most force measuring devices require some displacement and such a displacement inherently tends to make the system unstable. For example, a spring or steel yard type balance will not work as displacement from equilibrium with an attracted material causes the spring or weight restoring force to increase directly in proportion to the displacement but the attraction force of the magnet depends on the inverse of the fourth power of the distance between the magnet and the outcrop.

We have found that susceptibility alone can be measured by constantly measuring the displacement of the magnet from a predetermined position when the apparatus is placed upon a rock outcrop and applying a restoring force so as to tend to reduce the error to zero and measuring the value of the restoring force when the error has been reduced to a sufficiently small value, approaching zero. We have found that this may be done electrically through a feed back circuit.

Moreover, we have found that this may be done in a number of ways which will be most readily understood by reference to the drawings in which.

Figure 1:
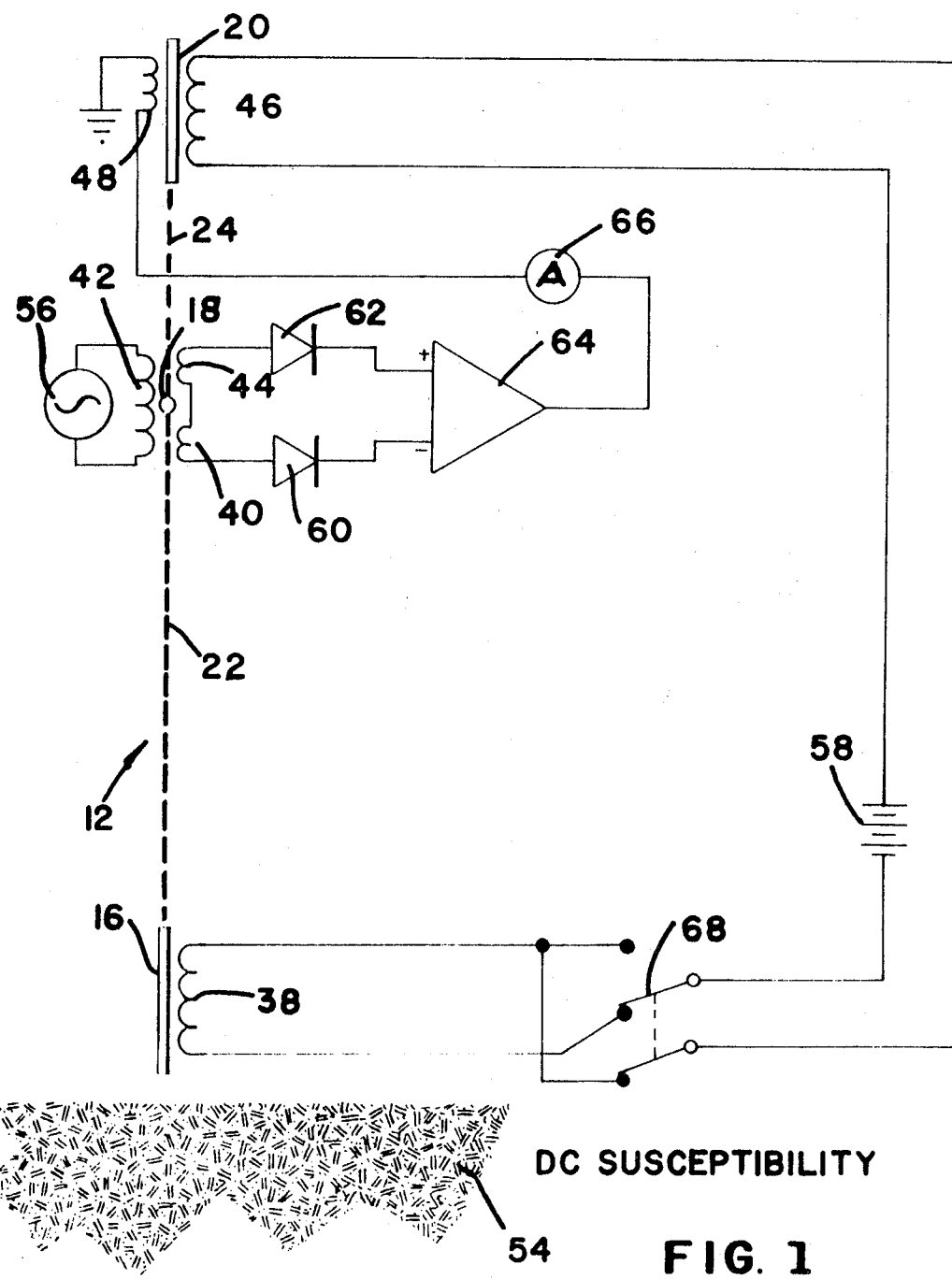
FIG. 1 is the circuit diagram of one embodiment.
Figure 2:
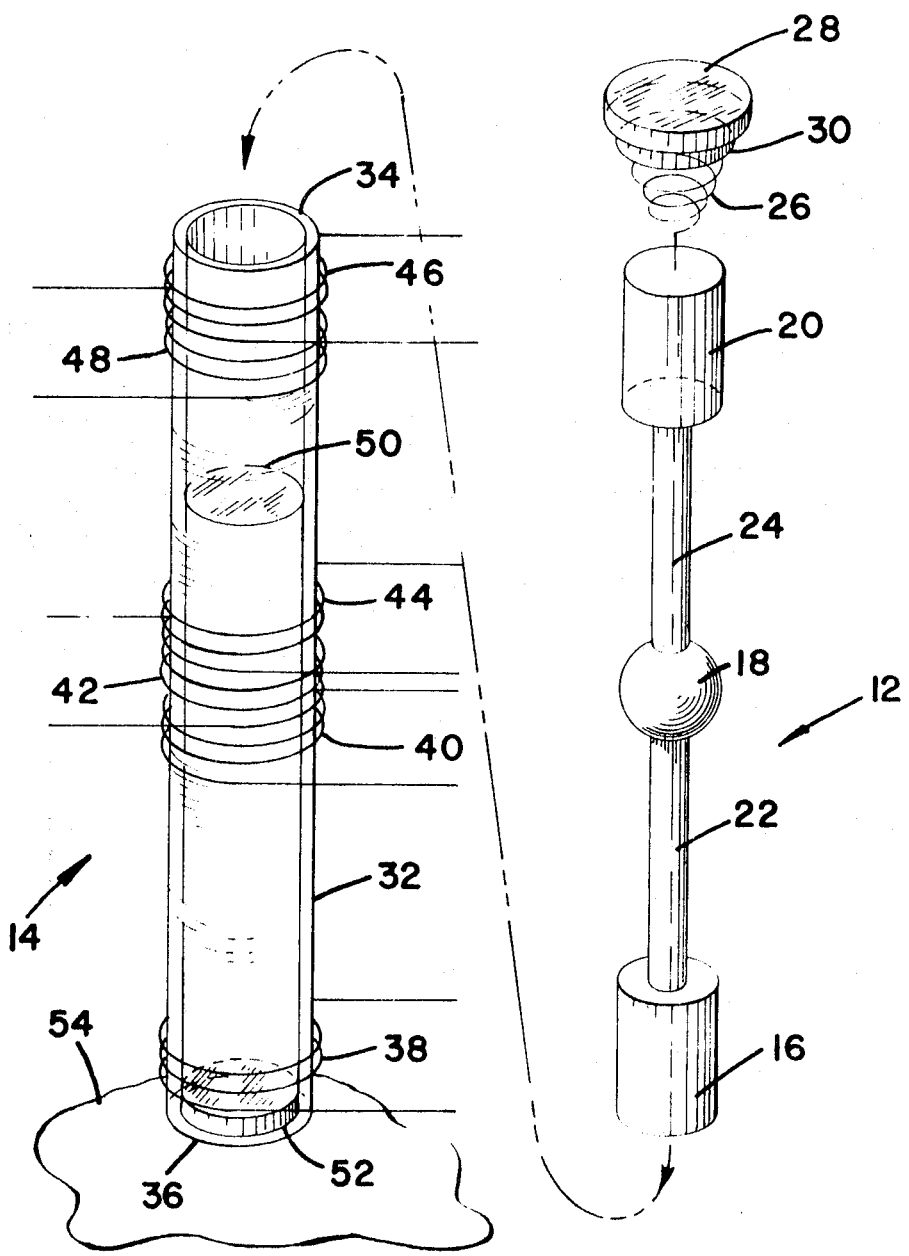
FIG. 2 is an exploded view of the instrument for use with the circuit of FIG. 1.

Referring to FIGS. 1 and 2 together, the instrument 10 comprises two main parts, a magnet shaft assembly 12 and a coil and surround assembly 14.

The magnet shaft, 12, assembly comprises three ferrite cores, 16, 18 and 20 spaced apart and bonded to two quartz rods 22 and 24. A spring 26 having considerable elastic extension under the weight of the magnet shaft assembly has one end attached to ferrite core 20 and the other end attached to cap 28 which has a register 30. The reasons for the spring attachment will be explained in due course.

The coil surround assembly 14 comprises a quartz tube 32 open at the top to provide a land 34 but having a closure at the bottom 36 to provide a liquid tight assembly. We prefer to use quartz rather than plastic as its thermal expansion is relatively small. Six coils of wire 38, 40, 42, 44, 46 and 48 are wrapped about the quartz tube 32 and are spaced as shown on FIG. 2 and connected as shown on FIG. 1. The tube is partly filled to a level 50 with a liquid which may be a very light oil or alcohol, and an elastic cushion 52 of rubber or the like is provided at the bottom.

When the magnet shaft 12 is inserted in coil surround assembly 14, ferrite core 16 extends beyond both ends of coil 38 (to avoid changes in magnetic circuit reluctance) ferrite core 18 is in the middle of coil 42 and ferrite core 20 extends well beyond the outer ends of coils 46 and 48 for the same reason as core 16.

The liquid rises on insertion of the magnet shaft to cover the top of core 20 and tends to buoy up the magnet shaft assembly which is retained in place by spring 26 when register 30 contacts land 34. In the equilibrium position the ferrite core 16 is between one-fourth inch and three-fourths inch above the outcrop surface 54 to be tested and has a total movement of about one-sixteenth inch downward from the equilibrium position before it contacts the rubber cushion 52.

Turning to the circuit diagram, the coil 42 is fed with a suitable source of alternating current 56. In the equilibrium position the ferrite core 18 couples coils 44 and 40 equally to coil 42 and there is no output. We prefer to make ferrite core 18 in the form of a sphere or prolate spheroid since any variation in differential coupling is gradual; however, it could be cylindrical similar to cores 16 and 20. In this case, the length required is rather critical relative to the spacing of coils 40, 42 and 44 which it differentially couples; if too short, excessive movement is required and if too long, the feed back error signal is too small.

Coils 38 and 46 are fed by a suitable source of direct current such as a battery 58; when this is switched on cores 16, 20 become magnetized to the same degree and core 16 is attracted to (or in some cases repelled by) outcrop 54 in proportion to the susceptibility of the specimen. However, immediately the magnet shaft 12 is displaced from its mid-position, say downwardly, the coupling of coil 40 with coil 42 increases. The output is rectified by means of rectifiers 60, 62 and fed to the input of operational amplifier 64 which feeds current to coil 48. This current increases until the ampere turns of coil 48 are sufficient to return the whole magnet shaft assembly 12 to the position where ferrite core 18 couples coil 40 and 44 equally to coil 42.

The susceptibility may be read from ammeter 66 which may be calibrated in henrys per meter for flat surfaces or it may be calculated from measured current which is directly proportional to $x/(x + 2)$ where $x$ is the susceptibility, the value 2 being for a flat surface. For curved surfaces, such as drill cores, correction calibrations will be necessary for direct reading instruments or the value in the expression will differ from 2.

It will now be understood that the purpose of the fluid 50 in the coil surround is two fold — it reduces the support required by spring 26 and hence the spring rate and also damps out quickly any tendency to oscillation. The rubber pad 52 absorbs any sudden movement of the magnet shaft 12.

A crossover switch 68 is provided to reverse the direction of the current through coil 38 so as to allow the mean of two current readings to be taken. The average value gives the mean susceptibility of the rock outcrop and the difference (which in most cases will be very small) is a function of the remanence. The coil 46 energizes core 20 proportionally to the energization of core 16 by coil 38 so that the magnetic effect of outcrop 54 is properly balanced by the ampere turns of coil 48.

Figure 3:
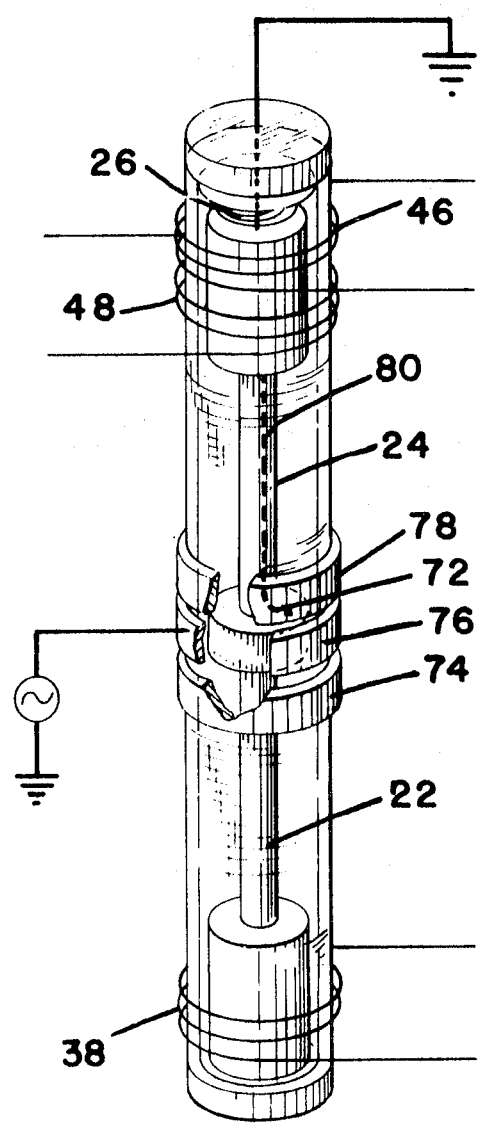
FIG. 3 is a perspective view of another type of instrument which may be used with the same circuit as FIG. 1.

FIG. 3 shows an alternative device which may be used with the same circuit, the only difference being that the differential coupling to give the error signal is capacitative rather than inductive. Thus, inner band 72 on the magnet shaft between members 22 and 24 couples either band 74 or band 78 to band 76, depending on which way the magnet shaft moves when the coil 38 is energized; the connection to band 72 can conveniently be made through spring 26 and connecting lead 80.

Reviewing the above explanation and the circuit diagram it will now be appreciated that the measurement of susceptibility itself is carried out by the forces of direct current and that the alternating current is merely a convenience for sensing purposes. Other sensing methods may be used as explained below.

Unfortunately, both the apparatus of FIGS. 2 and 3 suffer from the requirement of accurate location for the magnet shaft relative to the coil assembly and the difficulty of subsequent adjustment.

Figure 4:
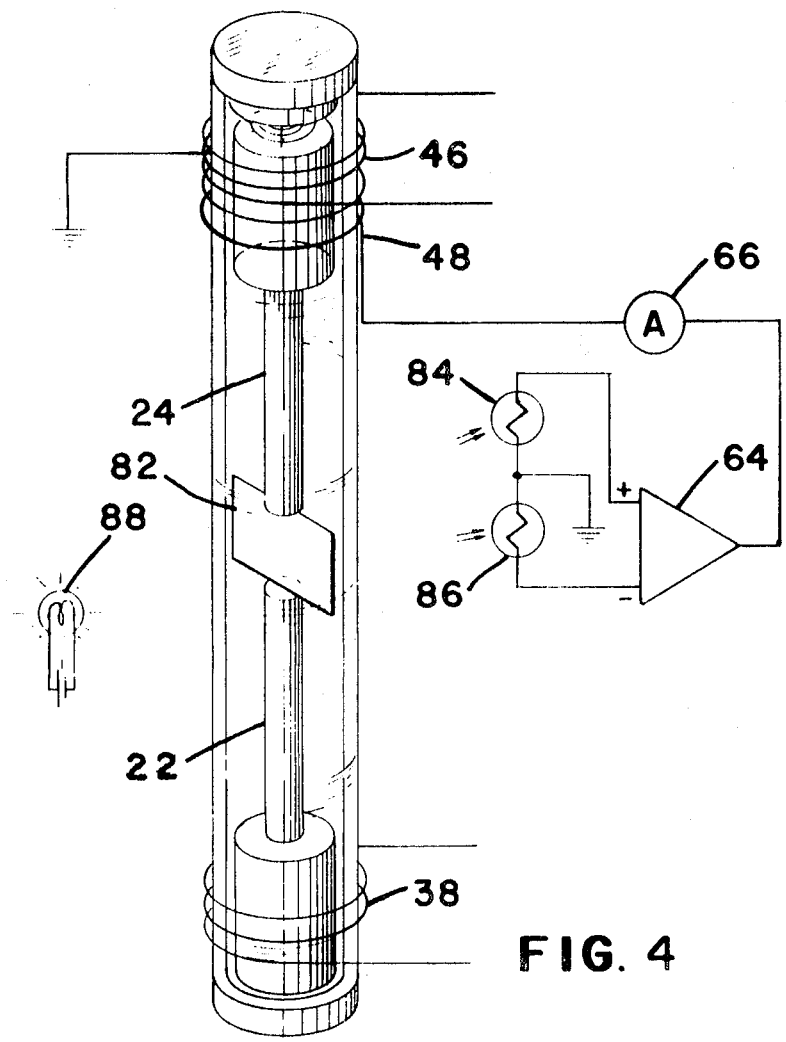
FIG. 4 is a perspective view of yet another type of instrument for use with the circuit of FIG. 1.

This is overcome by the apparatus of FIG. 4 in which a one piece magnet shaft (designated 22, 24 to avoid confusion) carries an optical mask 82 which in the equilibrium position, before measurement, shields light dependent resistors or photo cells 84, 86 equally from light source 88.

Figure 5:
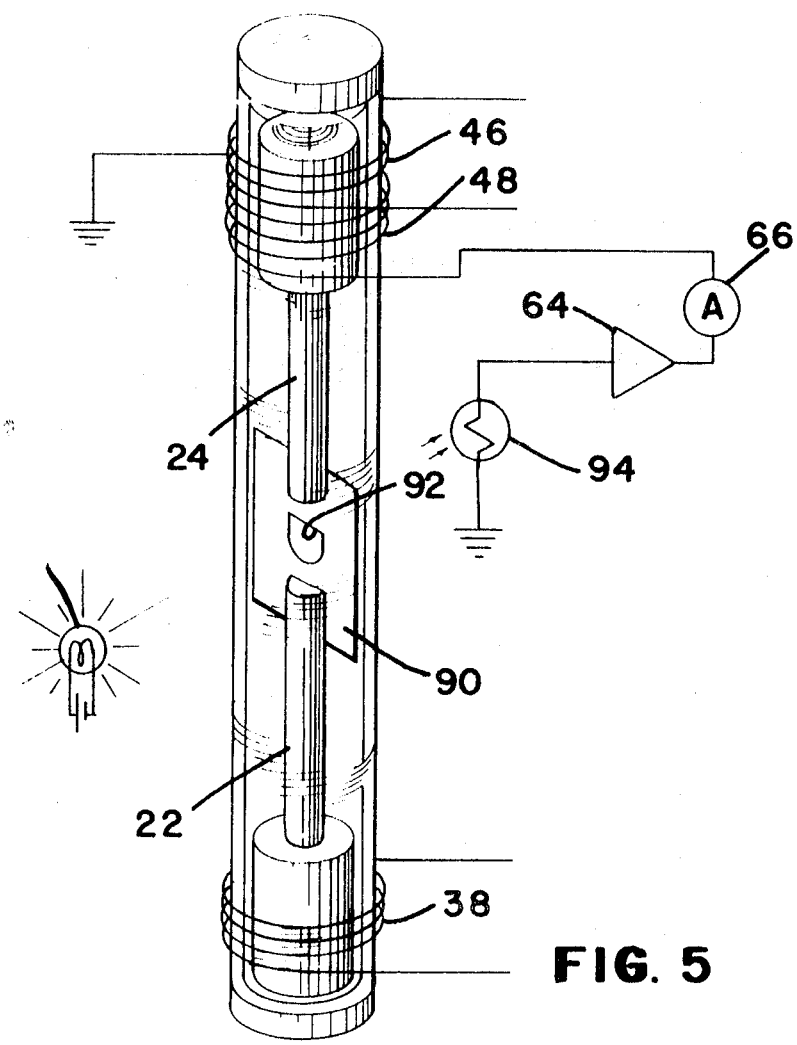
FIG. 5 is a semi-diagrammatic view of yet another instrument and a portion of the circuit diagram.

However, before proceeding to the description of FIG. 5 it will be understood that the basic method of the invention can be carried out manually by substituting an arcuate reflecting surface for mask 82 in FIG. 4 and focussing the light from point source 88 upon it so that the reflection falls upon a screen; by virtue of the arcuate shape of the reflector its lateral movement changes the angular position of the beam. The coil 48 is connected through ammeter 66 and across a battery and potential divider or other variable source of direct current, the operational amplifier and photo cells being omitted. The operator increases (or decreases as the case may be) the current in coil 48 to bring the magnet shaft back to its initial position; and the current required to hold it in equilibrium gives the value of susceptibility as before. Since there is no danger of oscillation, the operator supplying the feed back, the fluid in the coil surround assembly is omitted to avoid distortion of the focussed image.

In most cases, perhaps more than nine out of 10 specimens attract the magnet shaft, the exception being when lodestone or similar materials exhibit naturally induced permanent magnetism. FOr the vast majority of materials a simplification is possible as shown in FIG. 5 in which a lamp 88 shines through an opening 92 in a mask 90 to fall on photo cell 94. Any variation from the maximum signal caused by movement of the magnet shaft will cause the operational amplifier 66 to increase the current in coil 48; hence as upward movement is unstable the lower edge of opening 92 is made semi-circular; a stop may also be provided at the top to prevent upward movement from the equilibrium position.

Although for the sake of illustrating the principle of operation the ferrite cores 16 and 20 and coils 38 and 46 have been shown as similar this is not necessary; as a practical matter it is best to close the flux path of the magnetic circuit for core 20 as well known to those skilled in the art. Two alternative embodiments are shown in FIGS. 6 and 7.

Figure 6:
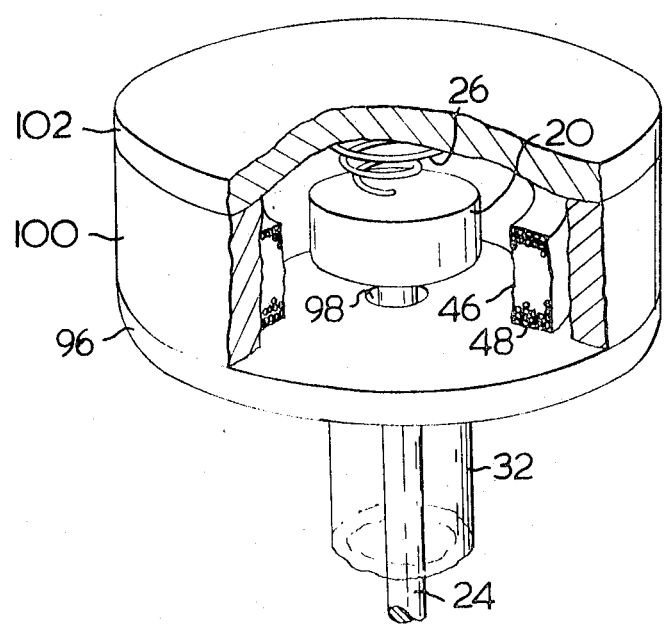
FIG. 6 and 7 show two alternative arrangement of the top part of the instrument.

FIG. 6 is an adaptation of a standard ferrite transformer core in which the base 96 accommodates a register on the underside, not shown, for quartz tube 32 and concentric with the register is a hole 98 which allows cores 16 and 18 to pass through it. The center core 20 is, of course, shortened to less than the axial length of the hollow ferrite cylinder 100 to allow for some displacement and the ferrite cap 102 completes the magnetic circuit. Coils 46 and 48 are coaxially wound and may be separate or wound together as an integral unit as shown.

Figure 7:
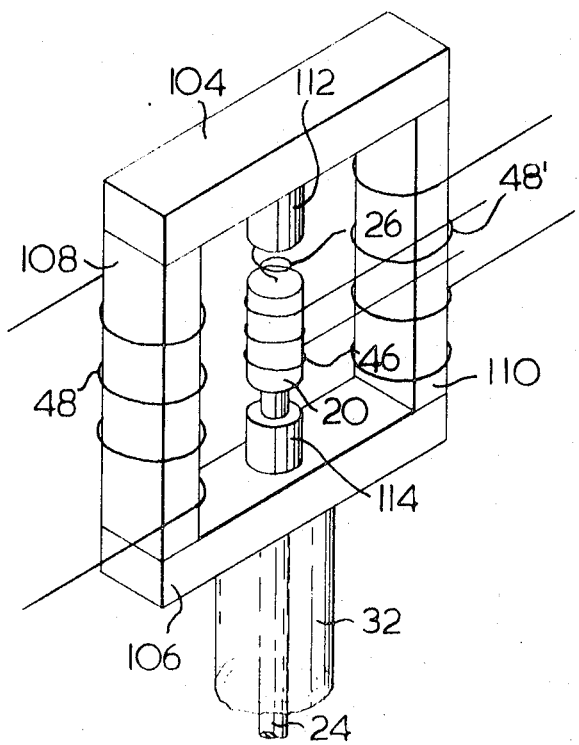

FIG. 7 is also another adaptation of a standard part in which a four limbed core 104, 106, 108, 110 has its central limb adapted to provide a core 20 between the stubs 112, and 114. In this case the coil 46 surrounds the core 20 but the equilibrium restoring current is fed to coil 48, 48' which is split between limbs 108, 110.

The cylindrical shape that we have shown for ferrite core 16 is preferred as a practical matter to any other shape as it is convenient, easy to manufacture and gives acceptable coupling with the specimen surface 54.

We claim:

1. A susceptibility meter adapted for field use comprising:
   a supporting structure having a base suitable for placement upon a rock outcrop,
   a magnet means above the support structure base;
   a resilient means connecting said magnet means to said support structure, the magnet means having sufficient weight relative to the resiliency of the connecting means to appreciably move said magnet means downwardly to establish an equilibrium position relative to said base in the absence of a rock outcrop;
   means for sensing the magnitude and direction of the displacement of the magnet means from said equilibrium position when said support structure base is placed upon a rock outcrop;
   means for applying a substantially vertical restoring force in a direction to return said magnet means to said equilibrium position;
   operating means connected to said sensing means and said restoring force applying means for reducing the restoring force as the magnet means approaches said equilibrium position to that static force required to maintain said magnet means at said equilibrium position;
   means to measure said static force; and
   damping fluid means adapted to cooperate with said magnet means to inhibit oscillation thereof about said equilibrium position.

2. A susceptibility meter adapted for field use comprising:
   a tube having a base suitable for placement upon a rock outcrop;
   a magnet means within said tube above said base;
   a resilient means connecting said magnet means to said tube, the magnet means having sufficient weight relative to the resiliency of the connecting means to move said magnet means downwardly to establish an equilibrium position relative to said base in the absence of a rock outcrop;
   a means for sensing the displacement of the magnet means from said equilibrium position when said support structure base is placed upon a rock outcrop;
   means for applying a substantially vertical restoring force in a direction to return said magnet means to said equilibrium position;
   an operating means connected to said sensing means and said restoring force applying means for reducing the restoring force as the magnet means approaches said equilibrium position to that static force required to maintain said magnet means at said equilibrium position;
   means to measure said static force; and
   a damping fluid within said tube adapted to cooperate with said magnet means to inhibit oscillation thereof about said equilibrium position.

* * * * *